United States Patent [19]

Kotera et al.

[11] 4,261,854
[45] Apr. 14, 1981

[54] PHOSPHOR

[75] Inventors: Noboru Kotera; Shusaku Eguchi, both of Odawara; Junji Miyahara, Minami-ashigara; Seiji Matsumoto, Minami-ashigara; Hisatoyo Kato, Minami-ashigara, all of Japan

[73] Assignees: Kasei Optonix, Ltd., Tokyo; Fuji Photo Film Co., Ltd., Kanagawa, both of Japan

[21] Appl. No.: 104,857

[22] Filed: Dec. 18, 1979

[30] Foreign Application Priority Data

Dec. 21, 1978 [JP] Japan ................ 53-159449

[51] Int. Cl.$^3$ ............................................ C09K 11/46
[52] U.S. Cl. .................... 252/301.4 H; 250/327.1; 250/484; 252/301.4 F; 252/408
[58] Field of Search .................. 252/301.4 H, 408 F; 250/327.1, 484

[56] References Cited

U.S. PATENT DOCUMENTS

| | | | |
|---|---|---|---|
| 3,079,347 | 2/1963 | Garrett et al. | 252/301.4 H |
| 3,163,610 | 12/1964 | Yocum | 252/301.4 H |
| 3,243,381 | 3/1966 | Yocum et al. | 252/301.4 H |
| 3,988,252 | 11/1974 | Ferretti | 252/301.4 H |
| 4,075,495 | 3/1978 | Stevels et al. | 252/301.4 H X |
| 4,180,478 | 12/1979 | Orni et al. | 252/301.4 H |

FOREIGN PATENT DOCUMENTS 2307029  11/1976  France .................. 252/301.4 H

OTHER PUBLICATIONS

Blasse et al. "The Journal of Chemical Physics", vol. 47, No. 6, Sep. 1967.

Primary Examiner—Jack Cooper
Attorney, Agent, or Firm—Gerald J. Ferguson, Jr.; Joseph J. Baker

[57] ABSTRACT

A barium fluorohalide phosphor represented by the formula $$BaFX:xCe,yA$$

wherein X is at least one halogen selected from the group consisting of chlorine, bromine and iodine, A is at least one metallic element selected from the group consisting of indium, thallium, gadolinium, samarium and zirconium, and x and y are numbers satisfying the conditions of $0 < x \leq 2 \times 10^{-1}$ 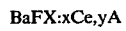 and $0 < y \leq 5 \times 10^{-2}$, respectively. The phosphor emits stimulated light of higher luminance than the conventional cerium activated barium fluorohalide phosphor when stimulated by light of wavelength ranging from 450 to 800 nm after exposure to ionizing radiations such as X-rays or γ-rays, ultraviolet rays, cathode rays, or the like. Further, the phosphor emits spontaneous light of high luminance when excited by ionizing radiations, ultraviolet rays, cathode rays, or the like. Furthermore, the phosphor emits thermoluminescent light of high luminance when heated after exposure to ionizing radiations, ultraviolet rays, cathode rays, or the like.

3 Claims, 3 Drawing Figures

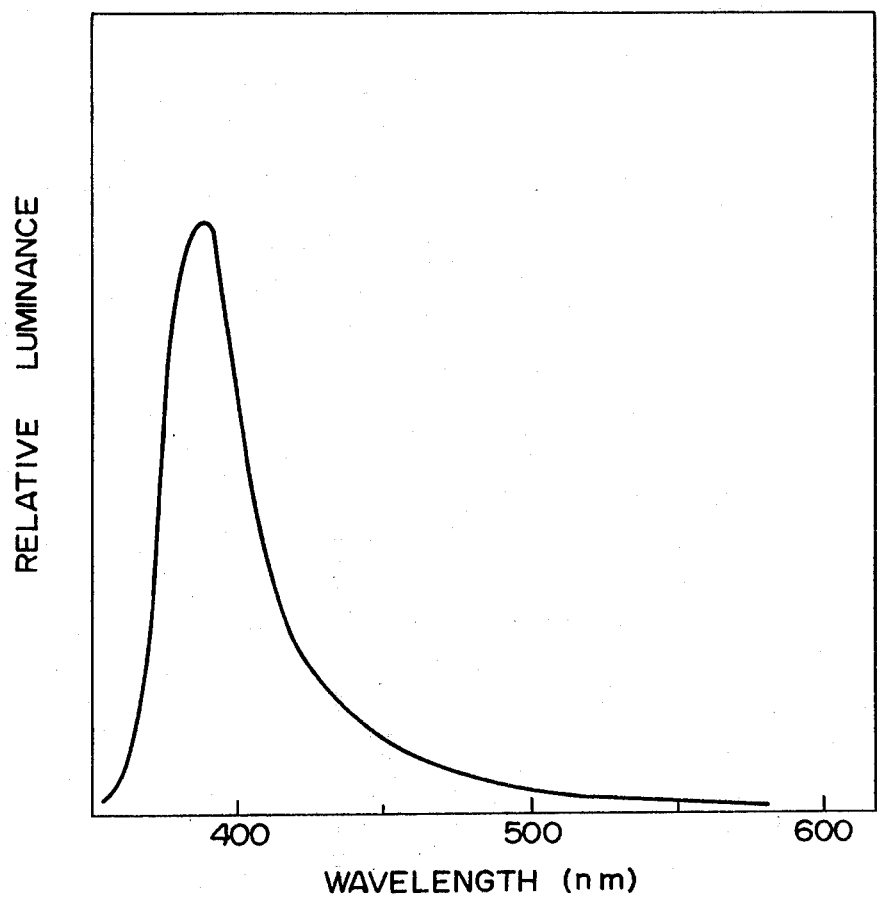
F I G. 1

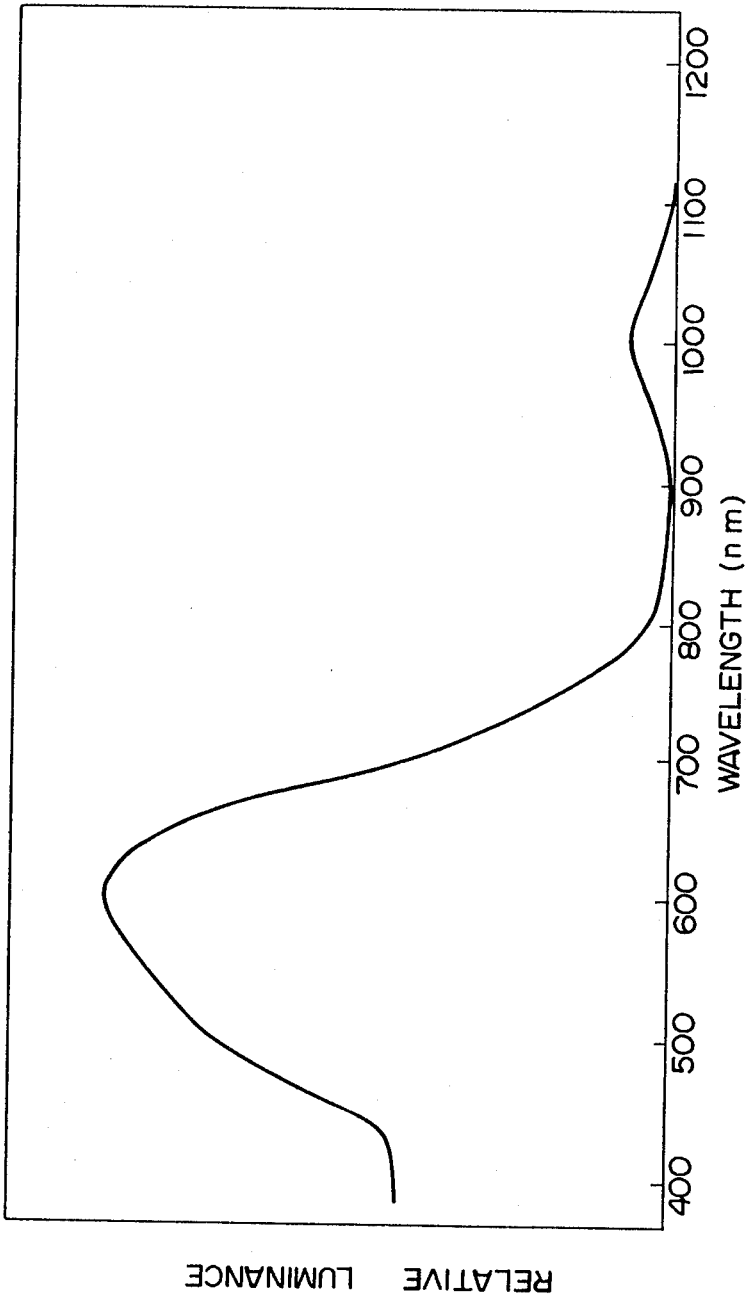

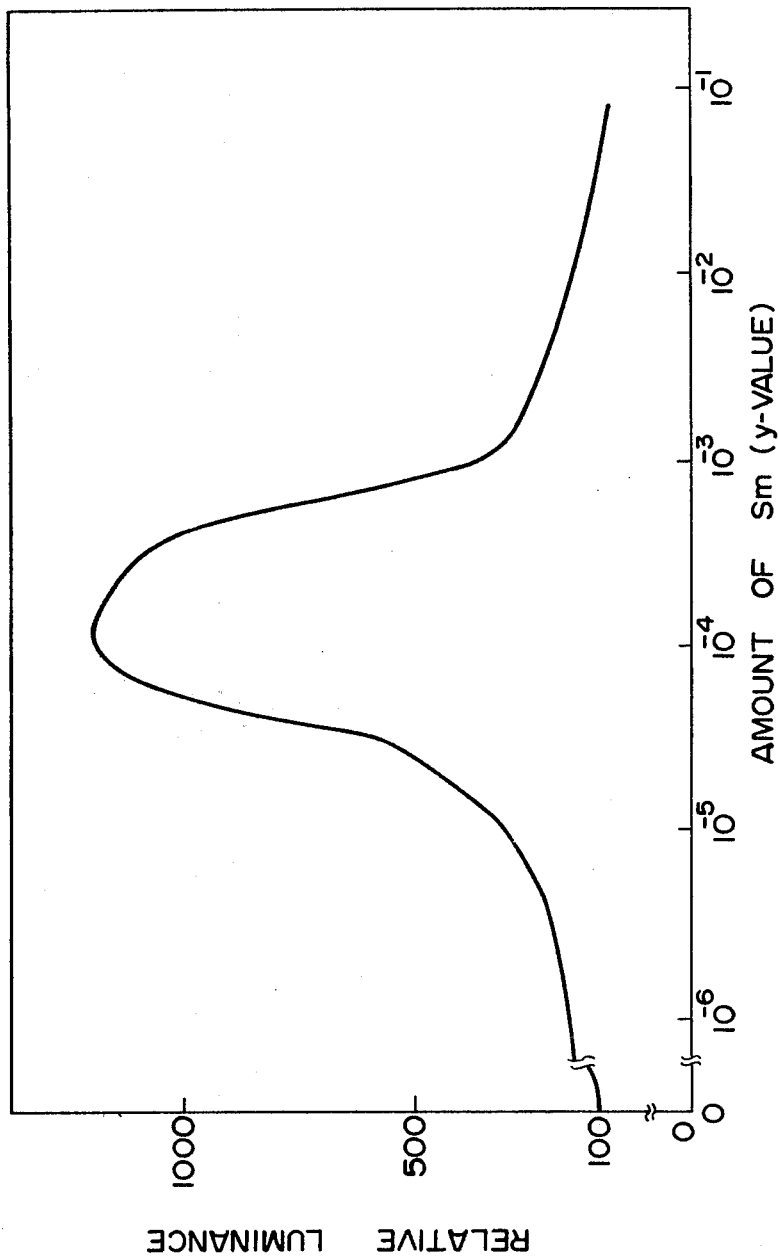

PHOSPHOR

BACKGROUND OF THE INVENTION

1. Field of the Invention

This invention relates to a phosphor, and more particularly to a barium fluorohalide phosphor.

2. Description of the Prior Art

Some kinds of phosphors emit fluorescent light when exposed to visible light or infrared rays after exposure to ionizing radiations, ultraviolet rays, cathode rays, or the like. This phenomenon is referred to as "stimulation", and the phosphor which exhibits stimulation phenomenon is referred to as "stimulable phosphor". It is known that a stimulable phosphor can be used for a radiation image storage panel. A radiation image of an object can be obtained by causing a panel of a stimulable phosphor to absorb a radiation such as X-rays transmitting through the object, and then exposing the panel of visible light or infrared rays to cause the stimulable phosphor to release the radiation energy stored therein as fluorescent light. Thus, a visible image can be observed or further recorded on a recording medium by detecting the fluroescent light.

In most cases of practical use of a radiation image storage panel, the object of the image is a human body. Accordingly, particularly when the radiation is ionizing radiations such as X-rays or γ-rays, it is required for a stimulable phosphor employed in the radiation image storage panel to have a higher luminance of stimulated emission morder to decrease a does of ionizing radiations on the object is exposed.

As a stimulable phosphor, a cerium activated barium fluorohalide phosphor represented by the following formula has been known in the art (see U.S. Patent Application Ser. No. 57,091):

BaFX:xCe wherein X is at least one halogen selected from the group consisting of chlorine, bromine and iodine, and x is a number satisfying the condition of $0 < x \leq 2 \times 10^{-1}$. The above cerium activated barium fluorohalide phosphor, however, is much more desired to have a higher intensity of stimulated emission in order to decrease a dose of ionizing radiations on the object exposed.

SUMMARY OF THE INVENTION

Therefore, an object of the present invention is to provide a cerium activated barium fluorohalide phosphor which emits stimulated light of higher luminance than the conventional cerium activated barium fluorohalide phosphor.

In order to accomplish the above-mentioned object, the inventors conducted various investigations to search the coactivator of cerium which was the activator of the above-mentioned phosphor. As a result of the investigations, it was found that the luminance of the light emitted from the cerium activated barium fluorohalide phosphor upon stimulation was markedly enhanced by incorporating in the phosphor at least one metallic element selected from the group consisting of indium, thallium, gadolinium, samarium and zirconium in a proper amount as the coactivator of cerium.

The phosphor of the present invention is represented by the formula

BaFX:xCe,yA wherein X is at least one halogen selected from the group consisting of chlorine, bromine and iodine, A is at least one metallic element selected from the group consisting of indium, thallium, gadolinium, samarium and zirconium, and x and y are numbers satisfying the conditions of $0 < x \leq 2 \times 10^{-1}$ and $0 < y \leq 5 \times 10^{-2}$, respectively. From a viewpoint of the intensity of luminance of stimulated emission, x and y of the above formula preferably satisfy the conditions of $10^{-6} \leq x \leq 5 \times 10^{-3}$ $10^{-5} \leq y \leq 10^{-3}$, respectively.

The phosphor of the present invention emits light of higher luminance than the conventional cerium activated barium fluorohalide phosphor when stimulated by light of wavelength ranging from 450 to 800 nm after exposure to ionizing radiations such as X-rays or γ-rays, ultraviolet rays, cathode rays, or the like. Further, the phosphor of the present invention emits near ultraviolet to blue spontaneous light of high luminance when excited by ionizing radiations, ultraviolet rays, cathode rays, or the like. Furthermore, the phosphor of the present invention emits thermoluminescent light of high luminance when heated after exposure to ionizing radiations, ultraviolet rays, cathode rays, or the like.

BRIEF DESCRIPTION OF THE DRAWINGS

FIG. 1 is a graph showing the stimulated emission spectrum of the phosphor of the present invention, FIG. 2 is a graph showing the stimulation spectrum of the phosphor of the present invention, and FIG. 3 is a graph showing the relationship between the amount of the coactivator (y value) of the phosphor of the present invention and the luminance of the light emitted from the phosphor upon stimulation.

DETAILED DESCRIPTION OF THE INVENTION

The present invention will be described in detail hereinbelow.

The phosphor of the present invention can be prepared by the following process.

The following raw materials are used:

(i) barium fluoride (BaF₂), (ii) at least one halide selected from the group consisting of barium chloride (BaCl₂), barium bromide (BaBr₂), barium iodide (BaI₂), ammonium chloride (NH₄Cl), ammonium bromide (NH₄Br) and ammonium iodide (NH₄I), (iii) a cerium compound such as cerium nitrate [Ce(NO₃)₃], cerium chloride (CeCl₃), cerium oxide (Ce₂O₃), etc., and (iv) at least one compound selected from the group consisting of indium compounds, thallium compounds, gadolinium compounds, samarium compounds and zirconium compounds such as chloride, fluoride, bromide, nitrate, oxide, etc.

The above-mentioned raw materials are weighted out in such a ratio that a mixture of raw materials stoichiometrically represented by the following formula is obtained, and mixed well by means of a ball mill, a mixer mill, or the like:

BaFX:xCe,yA wherein X is at least one halogen selected from the group of chlorine, bromine and iodine, A is at least one metallic element selected from the group consisting of indium, thallium, gadolinium, samarium and zirconium, and x and y are numbers satisfying the conditions of $0 < x \leq 2 \times 10^{-1}$ and $0 < y \leq 5 \times 10^{-2}$, respectively. When ammonium halide (NH$_4$X) is used, as the case may be, the amount of halogen contained in the mixture of raw materials becomes larger than that contained in the above-mentioned stoichiometric formula. However, in such a case, the excess of halogen is released from the reaction system in the form of NH$_4$X during firing and does not remain in the phosphor obtained.

Then, the mixture of raw materials is placed in a heat-resistant container such as an alumina crucible, a quartz crucible, or the like, and fired in an electric furnace. Although the firing may be performed in the air, the firing is preferably performed in an inert atmosphere such as an argon gas atmosphere or a nitrogen gas atmosphere, or in a weak reducing atmosphere such as a carbon vapor atmosphere or a nitrogen gas atmosphere containing a small amount of hydrogen gas. The firing temperature is within the range of 600° to 1000° C., preferably 700° to 900° C. Although the firing period is determined depending on the amount of the mixture of raw materials charged in the heat-resistant container, the firing temperature employed and so forth, the firing period is generally within the range of 1 to 6 hours. The luminance of the phosphor of the present invention can further be enhanced by firing the raw material mixture under the firing conditions mentioned above, taking out the fired product from the furnace, pulverizing the fired product and then refiring the pulverized fired product under the same firing conditions. After the firing, the fired product is pulverized. Then, the pulverized fired product is subjected to the processes generally employed in the production of a phosphor, such as washing, drying, sieving and so forth to obtain the phosphor of the present invention. When the phosphor of the present invention is washed, it is desirable that the phosphor is washed with a cooled water (below 15° C.) or an organic solvent such as acetone, ethyl acetate, ethyl alcohol, or the like, because the phosphor is apt to decompose in a warm water.

The barium fluorohalide phosphor of the present invention thus obtained exhibits light emission of higher luminance than the conventional cerium activated barium fluorohalide phosphor. Further, the phosphor exhibits spontaneous emission of high luminance. Furthermore, the phosphor exhibits thermo-stimulation of high luminance.

FIG. 1 is a graph showing the stimulated emission spectrum of the BaFBr:0.0005Ce,0.0001Sm phosphor of the present invention measured by stimulating the phosphor with a He-Ne laser beam after exposure to X-rays of 80 KVp. As is clear from FIG. 1, the BaFBr:Ce,Sm phosphor of the present invention exhibits near ultraviolet to blue stimulated emission having an emission peak in the neighbourhood of 390 nm. The spontaneous emission spectrum of the phosphor observed under excitation of X-rays, cathode rays, ultraviolet rays, or the like was almost the same as the stimulated emission spectrum shown in FIG. 1.

FIG. 2 is a graph showing the relationship between the wavelength of the stimulation rays and the luminance of the emitted light, that, is, the stimulation spectrum, of the BaFBr:0.0005Ce,0.0001Sm phosphor of the present invention. The stimulation spectrum was obtained by exposing the BaFBr:0.0005Ce,0.0001Sm phosphor to X-rays of 80 KVp, stimulating the phosphor with visible and infrared rays varying the wavelength thereof, and then measuring the luminance of the emitted light. As is clear from FIG. 2, the BaFBr:Ce,Sm phosphor emits light when stimulated by rays having a wavelength within the range of about 450 to 800 nm. In particular, the BAFBr:Ce,Sm phosphor emits light of high luminance when stimulated by rays having a wavelength within the range of about 450 to 700 nm.

Although FIGS. 1 and 2 respectively show the stimulated emission spectrum and the stimulation spectrum measured for the BaFBr:Ce,Sm phosphor of the present invention, the stimulated emission spectrum and the stimulation spectrum similar to those shown in FIGS. 1 and 2 were also obtained with respect to the other phosphor of the present invention wherein the coactivator of cerium (A) was indium, thallium, gadolinium, zirconium or at least two of indium, thallium, gadolinium, samarium and zirconium, or halogen constituting the matrix (X) was chlorine, iodine or at least two of chlorine, bromine and iodine. The stimulated emission spectrum and the stimulation spectrum of the conventional BaFX:Ce phosphor are also almost the same as those of the BaFBr:Ce,Sm phosphor shown in FIGS. 1 and 2. This means that the metallic element (A) incorporated in the phosphor of the present invention as the coactivator of cerium acts as the sensitizer of cerium.

FIG. 3 is a graph showing the relationship between the amount of the coactivator samarium (y value) of the BaFBr:0.0003Ce,ySm phosphor of the present invention and the luminance of the light emitted therefrom. The measurement of the luminance was performed by exposing the phosphor to X-rays of 80 KVp, and then stimulating the phosphor with a He-Ne laser beam. In FIG. 3, the luminance of the emitted light (ordinate axis) is represented by the relative value with respect to that of the conventional BaFBr:0.0003Ce phosphor defined to be 100.

As is clear from FIG. 3, when the amount of the activator cerium (x value) is constant, the BaFBR:0.0003Ce,ySm phosphor emits light of higher luminance than the conventional BaFBr:0.0003Ce phosphor when y is $0 < y \leq 5 \times 10^{-2}$. In particular, the BaFBr:0.0003Ce,ySm phosphor emits stimulated light of markedly high luminance when y is $10^{-5} \leq y \leq 10^{-3}$.

Although FIG. 3 shows data measured for the BaFBr:0.0003Ce,ySm phosphor of the present invention, it was confirmed that the results similar to that shown in FIG. 3 were also obtained with respect to the other phosphor of the present invention wherein x was other than 0.0003, or the coactivator of cerium (A) was indium, thallium, gadolinium, zirconium or at least two of indium, thallium, gadolinium, samarium and zirconium, or halogen constituting the matrix (X) was chlorine, iodine or at least two of chlorine, bromine and iodine.

In the phosphor of the present invention, the range of the amount of the activator cerium (the range of x value) is the same as that of the conventional cerium activated barium fluorohalide phosphor. That is, x is $0 < x \leq 2 \times 10^{-1}$. From the viewpoint of the luminance of the emitted light, x is preferably $10^{-6} \leq x \leq 5 \times 10^{-3}$.

As described hereinabove, the phosphor of the present invention emits light of higher luminance upon stimulation than the conventional cerium activated barium fluorohalide phosphor when stimulated by light of wavelength ranging from 450 to 800 nm after exposure to ionizing radiations such as X-rays or γ-rays, ultraviolet rays, cathode rays, or the like. Accordingly, the radiation image storage panel employing the phosphor of the present invention has a high luminance of stimulated emission than the radiation image storage panel employing the conventional cerium activated barium fluorohalide phosphor, Further, the phosphor of the present invention emits near ultraviolet to blue spontaneous light of high luminance when excited by ionizing radiations, ultraviolet rays, cathode rays, or the like, and accordingly, can be used in a radiographic intensifying screen, fluorescent lamp, cathode ray tube, etc. Furthermore, the phosphor of the present invention emits thermoluminescent light of high luminance when heated after exposure to ionizing radiations, ultraviolet ray, cathode rays, or the like, and accordingly, can be used in a thermoluminescent dosimeter, etc.

The present invention will hereinbelow be described referring to several examples.

EXAMPLE 1

| Barium fluoride | $BaF_2$ | 175.3 grams |
| Ammonium bromide | $NH_4Br$ | 97.9 grams |
| Cerium nitrate | $Ce(NO_3)_3$ | 0.163 grams |
| Indium chloride | $InCl_3$ | 0.022 grams |

The above raw materials were mixed well by means of a ball mill to obtain a raw material mixture of raw materials. The mixture obtained was placed in an alumina crucible and fired in an electric furnace. The firing was performed at a temperature of 800° C. for 2 hours in a carbon vapor atmosphere. After the firing, the fired product obtained was taken out of the furnace, cooled, and then pulverized. The pulverized fired product was washed with ethyl alcohol, dried, and then sieved by means of a sieve of 150 mesh. Thus, BaFBr:0.0005Ce,0.0001In phosphor was obtained.

Then, the luminance of stimulated emission of the BaFBr:0.0005Ce,0.0001In phosphor was measured. The measurement of the luminance was performed by exposing the phosphor to X-rays of 80 KVp, and then stimulating the phosphor with light of 630 nm which was obtained by causing the light emitted from a xenon lamp in a spectroscope to pass through a diffraction grating. The luminance of stimulated emission of the BaFBr:0.0005Ce,0.0001In phosphor (the height of stimulated emission peak) was about 11 times as high as that of the conventional BaFBr:0.0005Ce phosphor measured under the same conditions.

EXAMPLE 2

| Barium fluoride | $BaF_2$ | 175.3 grams |
| Ammonium bromide | $NH_4Br$ | 97.9 grams |
| Cerium nitrate | $Ce(NO_3)_3$ | 0.163 grams |
| Samarium chloride | $SmCl_3$ | 0.026 grams |

Employing the above raw materials, BaFBr:0.0005Ce,0.0001Sm phosphor was prepared in the same manner as described in Example 1.

Then, the luminance of stimulated emission of the BaFBr:0.0005Ce,0.0001Sm phosphor obtained was measured in the same manner as described in Example 1. The luminance of stimulated emission of the BaFBr:0.0005Ce,0.0001Sm phosphor (the height of stimulated emission peak) was about 12 times as high as that of the conventional BaFBr:0.0005Ce phosphor measured under the same conditions.

EXAMPLE 3

| Barium fluoride | $BaF_2$ | 175.3 grams |
| Ammonium bromide | $NH_4Br$ | 97.9 grams |
| Cerium nitrate | $Ce(NO_3)_3$ | 0.163 grams |
| Gadolinium chloride | $GdCl_3$ | 0.013 grams | phosphor was prepared in the same manner as described in Example 1.

Then, the luminance of stimulated emission of the BaFBr:0.0005Ce,0.00005Gd phosphor obtained was measured in the same manner as described in Example 1. The luminance of stimulated emission of the BaFBr:0.0005Ce,0.00005Gd phosphor (the height of stimulated emission peak) was about 8.5 times as high as that of the conventional BaFBr:0.0005Ce phosphor measured under the same conditions.

EXAMPLE 4

| Barium fluoride | $BaF_2$ | 175.3 grams |
| Barium chloride | $BaCl_2$ | 208.2 grams |
| Cerium nitrate | $Ce(NO_3)_3$ | 0.652 grams |
| Samarium chloride | $SmCl_3$ | 0.013 grams |

Employing the above raw materials, BaFCl:0.001Ce,0.00005Sm phosphor was prepared in the same manner as described in Example 1.

Then, the luminance of stimulated emission of the BaFCl:0.001Ce,0.00005Sm phosphor obtained was measured. The measurement of the luminance was performed by exposing the phosphor to X-rays of 80 KVp, and then stimulating the phosphor with a He-Ne laser beam. The luminance of stimulated emission of the BaFCl:0.001Ce,0.00005Sm phosphor (the height of stimulated emission peak) was about 10.5 times as high as that of the conventional BaFCl:0.001Ce phosphor measured under the same conditions.

EXAMPLE 5

| Barium fluoride | $BaF_2$ | 175.3 grams |
| Ammonium bromide | $NH_4Br$ | 58.7 grams |
| Ammonium chloride | $NH_4Cl$ | 21.4 grams |
| Cerium chloride | $CeCl_3$ | 0.025 grams |
| Samarium nitrate | $Sm(NO_3)_3$ | 0.017 grams |

Employing the above raw materials, BaF(Cl$_{0.4}$,Br$_{0.6}$):0.0001ce,0.00005Sm phosphor was prepared in the same manner as described in Example 1 except for performing the firing at a temperature of 750° C. for 3 hours.

Then, the luminance of stimulated emission of the BaF(Cl$_{0.4}$,Br$_{0.6}$):0.0001Ce,0.00005Sm phosphor obtained was measured in the same manner as described in Example 4. The luminance of stimulated emission of the BaF(Cl$_{0.4}$,Br$_{0.6}$):0.0001Ce,0.00005Sm phosphor (the height of stimulated emission peak) was about 11 times as high as that of the conventional BaF(Cl$_{0.4}$,Br$_{0.6}$):0.0001Ce phosphor measured under the same conditions.

EXAMPLE 6

| Barium fluoride | $BaF_2$ | 175.3 grams |
| Ammonium bromide | $NH_4Br$ | 97.9 grams |
| Cerium nitrate | $Ce(NO_3)_3$ | 0.163 grams |

| | | |
|---|---|---|
| Thallium nitrate | TlNO₃ | 0.053 grams |

Employing the above raw materials, BaFBr:0.0005Ce,0.0002Tl phosphor was prepared in the same manner as described in Example 1.

Then, the luminance of stimulated emission of the BaFBr:0.0005Ce,0.0002Tl phosphor obtained was measured in the same manner as described in Example 4. The luminance of stimulated emission of the BaFBr:0.0005Ce,0.0002Tl phosphor (the height of stimulated emission peak) was about 6 times as high as that of the conventional BaFBr:0.0005Ce phosphor measured under the same conditions.

EXAMPLE 7

| | | |
|---|---|---|
| Barium fluoride | BaF₂ | 175.3 grams |
| Ammonium bromide | NH₄Br | 97.9 grams |
| Cerium nitrate | Ce(NO₃)₃ | 0.163 grams |
| Zirconium sulfate | Zr(SO₄)₂ | 0.057 grams |

Employing the above raw materials, BaFBr:0.0005Ce,0.0002Zr phosphor was prepared in the same manner as described in Example 1.

Then, the luminance of stimulated emission of the BaFBr:0.0005Ce,0.0002Zr phosphor obtained was measured in the same manner as described in Example 4. The luminance of stimulated emission of the BaFBr:0.0005Ce,0.0002Zr phosphor (the height of stimulated emission peak) was about 4.5 times as high as that of the conventional BaFBr:0.0005Ce phosphor measured under the same conditions.

EXAMPLE 8

| | | |
|---|---|---|
| Barium fluoride | BaF₂ | 175.3 grams |
| Ammonium bromide | NH₄Br | 97.9 grams |
| Cerium nitrate | Ce(NO₃)₃ | 0.163 grams |
| Samarium nitrate | Sm(NO₃)₃ | 0.017 grams |
| Indium chloride | InCl₃ | 0.004 grams |

Employing the above raw materials, BaFBr:0.0005Ce,0.00005Sm,0.00002In phosphor was prepared in the same manner as described in Example 1.

Then, the luminance of stimulated emission of the BaFBr:0.0005Ce,0.00005Sm,0.00002In phosphor obtained was measured in the same manner as described in Example 4. The luminance of stimulated emission of the BaFBr:0.0005Ce,0.00005Sm,0.00002In phosphor (the height of stimulated emission peak) was about 10.5 times as high as that of the conventional BaFBr:0.0005Ce phosphor measured under the same conditions.

We claim:

1. A barium fluorohalide phosphor represented by the formula $$BaFX:xCe,yA$$

wherein X is at least one halogen selected from the group consisting of chlorine, bromine and iodine, A is at least one metallic element selected from the group consisting of indium, thallium, gadolinium, samarium and zirconium, and x and y are numbers satisfying the conditions of $10^{-6} \leq x \leq 2 \times 10^{-1}$ and $10^{-5} \leq y \leq 5 \times 10^{-2}$, respectively.

2. A barium fluorohalide phosphor as defined in claim 1 wherein said x is a number satisfying the condition of $10^{-6} \leq x \leq 5 \times 10^{-3}$.

3. A barium fluorohalide phosphor as defined in claim 1 wherein said y is a number satisfying the condition of $10^{-5} \leq y \leq 10^{-3}$.